(12) United States Patent
Jones

(10) Patent No.: US 7,165,972 B1
(45) Date of Patent: Jan. 23, 2007

(54) SYSTEM AND METHOD FOR SECOND LANGUAGE INSTRUCTION

(76) Inventor: Debra Jones, 875 Gladiator Way, Sandy, UT (US) 84094

( * ) Notice: Subject to any disclaimer, the term of this patent is extended or adjusted under 35 U.S.C. 154(b) by 0 days.

(21) Appl. No.: 10/739,903

(22) Filed: Dec. 17, 2003

Related U.S. Application Data

(60) Provisional application No. 60/434,294, filed on Dec. 17, 2002.

(51) Int. Cl.
G09B 19/08 (2006.01)

(52) U.S. Cl. ............. 434/157; 434/156; 434/185

(58) Field of Classification Search ............ 434/129, 434/157, 156, 167, 185; 273/292–308; 283/45, 283/46
See application file for complete search history.

(56) References Cited

U.S. PATENT DOCUMENTS

| 422,682 | A | * | 3/1890 | Young ............... 273/296 |
|---|---|---|---|---|
| 2,385,452 | A | | 9/1945 | Lande |
| 3,089,258 | A | | 5/1963 | Kavanagh et al. |
| 3,724,102 | A | | 4/1973 | Van Patten |
| 3,744,155 | A | | 7/1973 | De Monet |
| 3,871,115 | A | | 3/1975 | Glass et al. |
| 4,311,465 | A | | 1/1982 | Jacobs |
| 5,063,637 | A | | 11/1991 | Howard, Jr. et al. |
| 5,275,818 | A | | 1/1994 | Kind |
| 5,782,640 | A | * | 7/1998 | Sandlin ............... 434/157 |
| 5,899,698 | A | | 5/1999 | Sandlin |
| 5,934,708 | A | | 8/1999 | Batjuk |
| 6,024,571 | A | | 2/2000 | Renegar |
| 6,325,630 | B1 | | 12/2001 | Grabmayr |
| 6,685,188 | B1 | * | 2/2004 | Rehbein et al. ........ 273/299 |
| 6,884,076 | B1 | * | 4/2005 | Clark et al. .......... 434/172 |

OTHER PUBLICATIONS

"Instant Language Phrase Cards" found on www.langenscheidtref.com, Jul. 1, 2002.*
Speedy Spanish for Nursing Personnel, Copyright Baja Books 1988.
Spanish a language map, Copyright Bilingual Books, Inc. Seattle, WA 1999, Illustrations by Michelle Poole.

* cited by examiner

Primary Examiner—Dmitry Suhol
(74) Attorney, Agent, or Firm—Thorpe North & Western, LLP

(57) ABSTRACT

A system and method for teaching a speaker of a primary language the basic tools necessary to communicate with a speaker of the a secondary language in an accelerated and concise manner, including a base set of phrase or word cards and a profession-specific set of phrase or word cards, each of the cards including: a phrase or word in a primary language; a translation of the phrase or word in a secondary language; and a pronunciation key written in the primary language to aid a speaker in pronouncing the phrase or word in the secondary language. The cards can also include a visual depiction of a scenario which can aid the speaker in remembering both the pronunciation and meaning of a particular word or phrase.

13 Claims, 5 Drawing Sheets

FIG. 1a

Question

Quién
(key-IN)

Who is there?
¿Quién está, ahí?
(key-IN es-TAH ah-EE)

FIG. 1b

Who is putting their key in the door?

FIG. 2a ar-Verb

Aspirar
(ah-spear-ARE)

I don't want *to vacuum* the carpet.
No quiero aspirar la alfombra.
(no key-ARROW ah-spear-ARE law al-FOAM-bra)

FIG. 2b

I spilt the aspirin, I need to vacuum.

FIG. 3a er-Verb

Comer
(comb-AIR)

I want *to eat* chocolate.
Yo quiero comer chocolate.
(yo key-ARROW comb-AIR choke-oh-LOT-ay)

FIG. 3b

Don't comb your hair while I eat.

FIG. 4a ir-Verb

Pulir
(pull-EAR)

Let's *polish* the silverware.
Vamos a pulir la cubertería.
(VAH-mose ah pull-EAR law coo-BEAR-tear-EE-ah)

FIG. 4b

Mom has to pull my ear to get me to polish the silverware.

FIG. 5a

Adjective

Vacío
(bah-SEE-oh)

The room is *empty*.
El cuarto está vacío.
(el KWART-oh es-TAH bah-SEE-oh)

FIG. 5b

Ma, does "vacancy" mean empty?

Command

**Mueva
(MWAVE-ah)**

*Move* the table.
Mueva la mesa.
(MWAVE-ah law MAY-saw)

Move and wave goodbye.

Noun

**Montañas
(moan-TAWN-yahs)**

They are going to climb the *mountains*.
Ellos van a subir las montañas.
(AY-yos vahn ah sue-BEER laws moan-TAWN-yahs)

I moan when Tonya and I climb mountains.

Expression

Welcome
Bienvenido
(bee-in-vin-EE-dough)

Bee, your welcome in the vino.

FIG. 9a

Noun

**Carro
(CAR-row)**

The *service cart* is ready.
El carro de servicio está listo.
(el CAR-row day sair-VEE-see-oh es-TAH LEAST-oh)

FIG. 9b

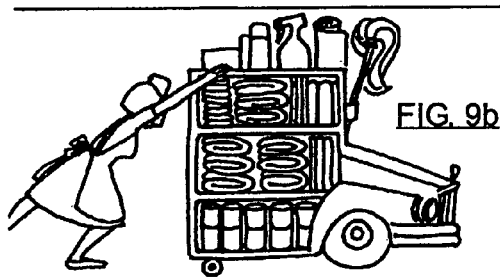
Pushing this cart is like pushing a big car.

FIG. 20a

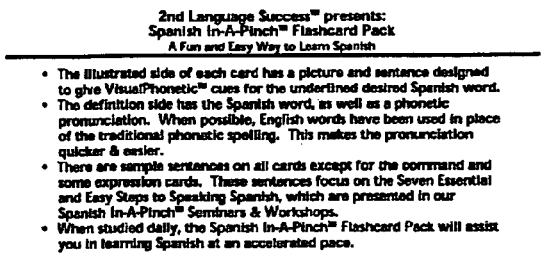

FIG. 20b

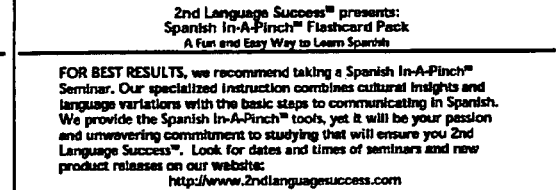

FIG. 21a

Spanish Alphabet a (ah) b (bay) c (say) d (day) e (ay) f (ef-fay)
g (hay) h (ah-chay) i (ee) j (ho-tah) k (kay)
l (el-lay) ll (a-yay) m (em-may) n (en-nay) ñ (en-yay)
o (oh) p (pay) q (coo) r (air-ray) s (es-say) t (tay)
u (oo) v (vay) w (dough-blay-vay) x (eh-keys)
y (ee-gree-ay-gah) z (set-ah)

FIG. 21b

Vowels

| Vowels | Pronunciation | Sounds Like: |
|---|---|---|
| a | 'ah' | Always |
| e | 'ay' | Ace |
| i | 'ee' | Easy |
| o | 'oh' | Open |
| u | 'oo' | Too |

FIG. 22a

FIG. 22b

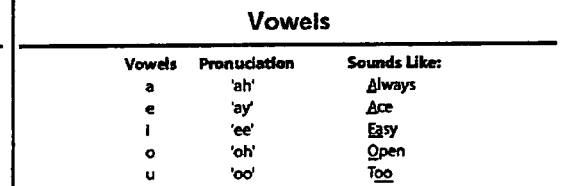

FIG. 23a

Verb Chart Instructions

There are three types of verbs in Spanish. These verbs end either in ar, er or ir.
- Each verb must be changed to agree with the sentence subject pronoun or subject. This is called conjugating.
- To conjugate a verb, you drop ar, er or ir ending and add the appropriate ending that corresponds to the subject pronoun or subject. See the back of each verb chart.
- Once the first verb in the basic sentence is conjugated, the other verbs don't need to be.
- In this FlashCard Pack we have included the most essential 7 verb cards: querer (to want); necesitar (to need); tener (que) (to have to); ir a (to go to); poder (can); estar (to be - temporary); ser (to be - permanent).

SYSTEM AND METHOD FOR SECOND LANGUAGE INSTRUCTION

This application claims benefit of U.S. Provisional Application No. 60/434,294, filed Dec. 17, 2002, which is incorporated herein by reference.

BACKGROUND OF THE INVENTION

1. Field of the Invention

The present invention relates generally to a system and method for easy and rapid instruction of second language skills. More particularly, the present invention relates to a system and method for rapid instruction of second language skills that can accelerate profession-specific language learning skills.

2. Related Art

While it may be that the English language is the primary, or most used, language in the United States, the number of people in the U.S. who do not speak English is increasing daily. For instance, it has been estimated that the number of U.S. residents who speak Spanish may shortly outnumber the residents who speak English. This increase of non-English speaking residents posses difficulties for many businesses and organizations. For example, many businesses located in the U.S. are structured around the English language. Advertisements, menus, directions, etc. are often provided in English. Many of a business' employees may speak little or no foreign (that is, non-English) languages. Conversely, an increasing number of an employer's employees may have little or no skill in speaking English.

In order to provide effective service to people who do not speak English, a business currently has a limited number of options. First, it may recruit and hire employees who speak multiple languages and who are capable of communicating and serving speakers of languages other than English. This is problematic in that the number of available people in the job pool are correspondingly decreased and the cost of employing the employees is increased.

Second, a business may train its existing employees in other languages to enable them to better serve customers who speak languages other than English. This option is problematic in that current foreign language systems can be very costly and very time consuming, and aren't focused toward teaching the basic language skills needed to communicate on a basic level with a speaker of the second language. Also, most conventional training systems are focused primarily on teaching second language skills which encompass a large array of situations in which a person may require or use the second language, rather than focusing on specific needs for a particular profession.

These problems also arise in the instance where a business employs employees who speak little or no English, but who are nonetheless expected to serve English speaking customers.

SUMMARY OF THE INVENTION

It has been recognized that it would be advantageous to develop a second language instruction system and method to teach a speaker of a first language the basic tools necessary to communicate with a speaker of the second language in an accelerated and concise manner. The present invention provides such a system and method and in one embodiment includes a base set of phrase or word cards and a profession-specific set of phrase or word cards, each of the cards including a phrase or word in a primary language, a translation of the phrase or word in a secondary language, and a pronunciation key written in the primary language to aid a speaker in pronouncing the phrase or word in the secondary language.

In accordance with a more detailed aspect of the present invention, the cards can also include a visual depiction of a scenario which can aid the speaker or learner in remembering both the pronunciation and the meaning of a particular word or phrase. In one embodiment, the scenario which is visually depicted can be a fanciful scenario designed to capture the attention and imagination of the speaker or learner.

In accordance with a more detailed aspect of the present invention, the system provides a set of cards that includes cards organized into focus categories. The focus categories can include Questions, AR Verbs, ER Verbs, IR Verbs, Adjectives, Commands, Nouns, Expressions, Profession, Verb Charts, Preterit Verbs, and Response.

In accordance with a more detailed aspect of the present invention, the method of the present invention includes the step of teaching a speaker how to conjugate and pronounce in the secondary language a base set of secondary language verbs. After learning to conjugate and pronounce the base set of secondary language verbs, a user can then easily and rapidly apply the base set of verbs in a profession-specific environment.

In accordance with a more detailed aspect of the present invention, the present system and method is incorporated into a seminar format that can be used to present the concepts taught by the present invention to a group of speakers.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIGS. 1a and 1b through 9a and 9b illustrate the front and back, respectively, of exemplary phrase or word cards that can be employed with the present system and method;

FIGS. 10a and 10b through 16a and 16b illustrate the front and back, respectively, of exemplary Verb Chart cards that can be employed with the present system and method;

FIGS. 17a and 17b through 19a and 19b illustrate the front and back, respectively, of exemplary Verb Conjugation cards that can be employed with the present system and method;

FIGS. 20a and 20b through 22a and 22b illustrate the front and back, respectively, of exemplary Miscellaneous Cards that can be employed with the present system and method;

FIG. 23a illustrates the front of another exemplary Miscellaneous Card that can be employed with the present system and method;

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in the figures, a system, in accordance with the present invention, is shown for a system and method of second language instruction. The present invention can be used with any primary and secondary language to quickly and efficiently instruct speakers of the primary language in speaking and understanding the secondary language. As used herein, the primary language is a language in which the speaker is more or less fluent, whereas the secondary language is one which the speaker cannot speak or understand, or can only do so to a limited extent. A "speaker," as used herein, is meant to indicate a person, student, user of, or speaker of, a language.

To more effectively provide a detailed description of the present invention, the primary and secondary languages will be discussed herein as constituting English and Spanish, respectively. It is of course understood that the present invention is in no manner so limited. The primary and secondary language can be any known to those skilled in the art and either the primary or secondary language can be English, Spanish, French, German, Chinese, Japanese, etc. The system and method can be as easily implemented using, for instance, Spanish as the primary language and English as the secondary language. However, to simplify the disclosure herein, it will be assumed that English is the primary language and Spanish is the secondary, thus the present invention will be illustrated as a system and method for instructing English speakers in speaking and understanding Spanish.

As shown in FIGS. 1a and 1b, the system can include a series of cards that can include a word or phrase 12 in Spanish. Adjacent the phrase 12 is a pronunciation key 14 which is configured to be read by a speaker of English to enable the speaker to pronounce the phrase in Spanish. An exemplary phrase 16 in English can also be included on the card to illustrate how the phrase may be used in a sentence. A translation 18 of the exemplary phrase can also be included, as well as a pronunciation key 20 to assist the speaker in pronouncing the exemplary phrase in Spanish. While the word or phrase presented on any particular card can include any word or common phrase, the discussion herein will treat a word or phrase as the same and reference will be made only to a phrase. It is to be understood that a phrase, as used herein, can include as few as one word or as many as is necessary for any particular statement.

In the example provided in FIGS. 1a and 1b, the word 12 is Quién, which, translated at 16, means "who" in English. The pronunciation key 14 indicates to the speaker that the word 12 is properly pronounced in English as "key-IN." The translation 16, in addition to providing the English meaning of the word, provides an exemplary phrase to aid the speaker in understanding how the word is used, for example, "Who is there?" The translation 18 of the exemplary phrase provides a translation of the exemplary phrase in Spanish, that is, "Quién está?" The pronunciation aid 20 provides the proper pronunciation of the exemplary phrases 18. Thus, the present system and method presents a key word or phrase in Spanish, and includes most of the information required by a speaker of English to use or understand the key word or phrase.

Additional information can be included on the reverse side of the card, as illustrated by FIG. 1b, where a visual depiction of some scenario in which the phrase 12 may be used is presented. For instance, the illustration in FIG. 1b depicts a hand inserting a key into a lock. The visual depiction 22 can aid the speaker in remembering the Spanish translation of the phrase 12. Near the visual depiction 22, another phrase 24 in English can be included to complement the visual depiction.

As an example of how the present invention may be implemented, the card shown in FIGS. 1a and 1b includes the word Quién. The Spanish word Quien 12 is translated to "who" in translation 16 in FIG. 1a. The pronunciation key 14 informs the speaker that Quien is pronounced "key-IN" in Spanish. The phrase 24 reads "Who is putting their key in the door?" The concept which aids the speaker in remembering how the word Quien is used is indicated at 26 by "key in." Thus, Quien means "who" and, upon hearing or attempting to recall the word, the speaker's memory can visualize the depiction 22 and remember the phrase 24 "who is putting their key in the door?," thereby recalling that Quien means "who" and is pronounced "key in."

As illustrated in the various figures, the visual depiction 22 can include a fanciful scenario designed to capture the attention and imagination of the speaker. Thus, the depiction 22 on card 1b includes a question mark dangling from a key chain. As another example, FIG. 2b illustrates the use of the word "Aspirar," or to vacuum. The visual depiction illustrates a man who spilt aspirin and needs to clean, or vacuum, up the aspirin. The phrase "spilt the aspirin, I need to vacuum," keys the speaker into the fact that "aspirar," which is pronounced similarly to "aspirin," means "to vacuum" in Spanish. The fanciful design of the visual depictions not only provide important information to the speaker, but does so in a way to better enable the speaker to remember the information and to make the learning process more fun and enjoyable for the speaker.

The present invention thus provides a unique and effective way of not only teaching Spanish language skills but assisting a speaker in better remembering the rudiments of the Spanish language. Illustrated in FIGS. 2a through 9b are other Spanish words or phrases which include many of the features discussed in regard to FIGS. 1a and 1b. The phrases shown in the figures are of course not exhaustive of the phrases which can be presented by the present invention. The phrases presented can be tailored to the particular needs and skills of a speaker, and can, in one embodiment, be tailored to skills and needs related to the speaker's profession.

The information on the cards shown in FIGS. 1a through 9b also illustrates the manner in which the cards can be categorized or grouped. For instance, in one embodiment of the present invention, a base set of cards is included which instruct a speaker of English on the basics of speaking Spanish. The base group of cards can include cards categorized in the following groups: Questions, AR Verbs, ER Verbs, IR Verbs, Adjectives, Commands, Nouns, Expressions, Preterit Verbs, and Response. Each card in these separate categories can include a title 28, as illustrated in FIG. 1a. Of course, the base set of cards can include words categorized in any groups, and can include any number of cards organized in any manner. In one embodiment, the base group of cards includes about 200 cards, which the inventor has found is a sufficient number of phrases for a speaker to learn quickly, without overwhelming the speaker with too much information.

The card illustrated in FIGS. 9a and 9b, while entitled a "Noun" card, can be included as a "profession specific" card, that is, a card that can be included in addition to the base set of cards and directed toward words or phrases that may most be used in a particular profession. The card in FIGS. 9a and 9b may be used, for instance, by those working in the housekeeping profession, who, for example, may need to know the meaning of the word "carro," or cart. Thus, a speaker can be presented a series of "base" cards organized into categories such as Questions, AR Verbs, ER Verbs, IR Verbs, Adjectives, Commands, Nouns, and Expressions, which are presented to provide the speaker a base level of skill in speaking Spanish. The base set of cards can then be supplemented by a series of profession-specific cards which the speaker can use in conjunction with the base cards to quickly learn to understand and speak complete phrases related to his or her profession. Professions that can benefit from the system and method provided by the present invention include the banking industry, the medical industry, the hotel industry, construction, sales, food service, landscaping, shipping, teaching, housekeeping, and many more.

As illustrated in FIG. 1a, the header portion 30, of each card can be color- or otherwise coded to assist speakers in keeping the cards organized and in quickly identifying which cards include which type of word or phrase. Thus, each of the categories listed above can be included on cards having distinctly colored or patterned header portions 30 which distinguish the type of information included on any particular card.

FIGS. 10a through 16a illustrate another advantageous feature of the present invention. Shown here are a representative series of base verbs which can be selected to present to learners of the present method in order to focus on a core set of verbs associated with the primary language. For example, shown in the figures are the verbs querer (to want), necesitar (to need), tener (que) (to have (to)), ir a (to go to), poder (can), estar (to be), and ser (to be). Instructing a speaker on the meaning and conjugation of this core set of verbs can enable the speaker to communicate regarding almost any basic action on a level sufficient to understand or speak with a speaker of Spanish. Coupling knowledge of these basic verbs with the words and phrases in the remainder of the cards quickly enables a speaker to become sufficiently proficient in Spanish to competently perform his or her job duties. Of course, the examples given of the core set of verbs are only exemplary, the core set of verbs is not limited in number to seven, and can include additional or alternate verbs as those included in the figures.

The cards illustrated in FIGS. 10a through 16b also include an additional advantageous feature of the present invention. Each verb of the base set of verbs, or any verb presented in the present invention, can include on the reverse side of the card a concise explanation of how the verb is properly used. For instance, shown at FIG. 10b are a series of singular and plural pronoun conditions in which the verb may be used. The different singular and plural pronoun conditions are indicated in FIG. 10b by icons 44, 46, 48, 50, 52, and 54. The same set of icons corresponding to the same conditions (and the same reference numbers) are also illustrated in FIG. 17a. FIG. 17a instructs the speaker on the meaning of the various pronoun conditions, i.e., I, you, you (formal), we, you all, and you (all) or they, respectively.

Thus, if a speaker wishes to communicate the phrase "I want a cart," the speaker refers to card 9a, which instructs that "cart" is "carro" (pronounced CAR-row) in Spanish. The speaker would then consult card 10a to learn that the form of "want" in the singular case ("I," as illustrated by the icon 44 in card 17b), is "quiero." The proper pronoun to be used is provided by card 10b, which instructs, after again referencing icon 44, that the pronoun for "I" is "yo." Thus, the speaker can quickly learn that the phrase "I want a cart" is properly translated and pronounced "yo quiero un carro." With the use of only a few cards, the speaker can properly pronounce the correct noun, conjugate the correct verb, and select the correct pronoun to be used.

The present invention thus not only instructs a speaker on all the above-referenced steps, but does so in a way that the speaker can use to streamline the process for successive phrases, as the pronoun and verb conjugation instructions are used consistently throughout the system and method. For instance, the subject pronoun selection for each of the core set of verbs is consistently presented and keyed into the same icons on the reverse side of each core verb (see, i.e., cards 10a through 16b). A general verb conjugation card is also presented for each of the AR, ER, and IR verbs, as illustrated in FIGS. 17a through 19a, respectively. The subject pronoun usage is again presented in a consistent manner with the same icons consistently used to key the speaker into the proper usage. The information presented on cards 17a through 19b, once learned by a speaker, can be used to properly conjugate most AR, ER, and IR verbs, including choosing or learning which pronoun is the proper one to use.

Cards 20a through 23a illustrate various miscellaneous cards that can be provided to further assist a speaker in implementing the features of the present invention. For instance, card 20a includes a brief description of how to use the system. Cards 21a through 22b include various information relating to the Spanish alphabet, vowels, agreement rules and possessives. Card 23a instructs the speaker in how to best utilize the various Verb Charts provided.

In addition to the use of cards discussed above, it is also contemplated that the present invention can be incorporated into a seminar format. For example, features of the present invention can be taught to a speaker or group of speakers in a logical and straightforward manner by presenting information to the speakers in the general format illustrated on the cards shown. Thus, speaker or speakers can be quickly enabled to use the present method to learn a second language. These types of seminars could be used in a variety of applications, for example, seminars for educators, seminars for housekeeping employees, etc.

Another advantageous feature of the present invention is illustrated by the color highlighting applied to each of the exemplary cards presented (note that the highlighting is only exemplary, as different colored fonts may also be used). As illustrated in FIG. 1a, the information provided to the speaker can be coded to enable the speaker to rapidly identify relevant information on any section of the cards. In one embodiment, all of the Spanish phrases can be written in the same color, in this example, black, as shown at 16. The English translations can all be written in red, as shown at 16, and all of the pronunciation keys can be written in blue. In this manner, once a speaker becomes accustomed to the color coding system, the speaker can quickly and easily move from one phrase to another and quickly identify the English, Spanish and pronunciation components of each phrase. As is apparent from viewing each of the exemplary cards provided herein, the coding system can be used in conjunction with all of the information provided, up through and including the Possessives card 22b.

Of course, the information coding system is not limited to the colors shown and described herein, but could be any selection of colors. The organization coding system is likewise not limited to the use of colors, but could, for example, be done by using a different font for each of the English, Spanish and pronunciation components. By utilizing such an organization scheme, the present invention provides continuity between different cards or other products created in accordance with the present invention. That is, the organization system enables a user who is trained in the use of the cards as illustrated herein to quickly adapt to other products created using the same technology.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method of instructing a speaker of a primary language to speak a secondary language, comprising the steps of:
    presenting on a substrate to the speaker a phrase in the primary language, the phrase in the primary language having a pronunciation in a secondary language that is different than a pronunciation of the phrase in the primary language;
    presenting to the speaker a translation of a meaning of the phrase in the secondary language;
    presenting to the speaker a pronunciation key written in the primary language to aid the speaker in pronouncing the phrase in the secondary language; and
    presenting to the speaker a visual depiction of a scenario, the visual depiction of the scenario conveying information relating to both a pronunciation of the phrase in the secondary language and the meaning of the phrase;
    wherein the method provides, in an accelerated manner, the speaker with basic tools necessary to communicate in the secondary language.

2. The method of claim 1, wherein step of presenting to the speaker a visual depiction of a scenario includes the step of presenting to the speaker a fanciful scenario configured to aid the speaker in remembering both a pronunciation and the meaning of the phrase.

3. The method of claim 2, wherein the fanciful scenario depicts at least one object whose pronunciation in the primary language corresponds to at least a portion of the pronunciation of the phrase in the second language.

4. The method of claim 1, comprising the further step of presenting to the speaker a complementary phrase in the primary language that includes at least one word in the primary language that forms a part of the pronunciation of the phrase in the secondary language.

5. The method of claim 1, comprising the further step of presenting to the speaker a complementary phrase in the primary language that corresponds to and complements the visual depiction of the scenario.

6. The method of claim 5, wherein the complementary phrase includes at least one word in the primary language that corresponds to at least a portion of the pronunciation of the phrase in the secondary language.

7. The method of claim 1, comprising the further step of presenting to the speaker a plurality of phrases in the primary language that are each related to a specific profession.

8. A method of instructing a speaker of a primary language to communicate in a secondary language, comprising the steps of:
    presenting on a substrate to the speaker a phrase in a primary language, the phrase in the primary language having a pronunciation in a secondary language that is different than a pronunciation of the phrase in the primary language;
    presenting to the speaker a translation of a meaning of the phrase in the secondary language;
    presenting to the speaker a pronunciation key written in the primary language to aid the speaker in pronouncing the phrase in the secondary language presenting to the speaker a complementary phrase in the primary language that includes at least one word in the primary language that forms a part of the pronunciation of the phrase in the secondary language; and
    presenting to the speaker a visual depiction of a fanciful scenario, the fanciful scenario conveying:
        information relating to the meaning of the phrase; and
        information unrelated to the meaning of the phrase.

9. The method of claim 8, wherein the fanciful scenario conveys information relating to both a pronunciation of the phrase in the secondary language and the meaning of the phrase.

10. The method of claim 8, wherein the fanciful scenario depicts at least one object whose pronunciation in the primary language corresponds to at least a portion of the pronunciation of the phrase in the second language.

11. The method of claim 8, comprising the further step of presenting to the speaker a complementary phrase in the primary language that corresponds to and complements the visual depiction of the scenario.

12. The method of claim 11, wherein the complementary phrase includes at least one word in the primary language that corresponds to at least a portion of the pronunciation of the phrase in the secondary language.

13. The method of claim 8, comprising the further step of presenting to the speaker a plurality of phrases in the primary language that are each related to a specific profession.

* * * * *